United States Patent
Corn et al.

(10) Patent No.: US 11,446,911 B2
(45) Date of Patent: Sep. 20, 2022

(54) CONSUMER SCRUBBING ARTICLE WITH SOLVENT-FREE TEXTURE LAYER AND METHOD OF MAKING SAME

(71) Applicant: 3M INNOVATIVE PROPERTIES COMPANY, St. Paul, MN (US)

(72) Inventors: Stewart H. Corn, St. Paul, MN (US); Ibrahim S. Gunes, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 933 days.

(21) Appl. No.: 16/078,204

(22) PCT Filed: Feb. 16, 2017

(86) PCT No.: PCT/US2017/018034
§ 371 (c)(1),
(2) Date: Aug. 21, 2018

(87) PCT Pub. No.: WO2017/146969
PCT Pub. Date: Aug. 31, 2017

(65) Prior Publication Data
US 2021/0213701 A1 Jul. 15, 2021

Related U.S. Application Data

(60) Provisional application No. 62/300,604, filed on Feb. 26, 2016, provisional application No. 62/365,413, filed on Jul. 22, 2016.

(51) Int. Cl.
*B32B 33/00* (2006.01)
*B32B 5/24* (2006.01)

(52) U.S. Cl.
CPC .............. *B32B 33/00* (2013.01); *B32B 5/245* (2013.01); *B32B 2255/02* (2013.01);
(Continued)

(58) Field of Classification Search
CPC ..... B32B 33/00; B32B 5/245; B32B 2266/02; B32B 2307/4023
(Continued)

(56) References Cited

U.S. PATENT DOCUMENTS

| 2,978,340 A | 4/1961 | Veatch |
| 3,030,215 A | 4/1962 | Veatch |

(Continued)

FOREIGN PATENT DOCUMENTS

| CA | 1067765 | 12/1979 |
| CN | 201538920 | 8/2010 |

(Continued)

OTHER PUBLICATIONS

US 6,027,799 A, 02/2000, Castle (withdrawn)
(Continued)

*Primary Examiner* — Betelhem Shewareged

(57) ABSTRACT

A scrubbing article including a substrate and a texture layer. The texture layer is formed on at least one surface of the substrate, and is a solvent-free texture layer. The texture layer can include a plastisol ink or a hot melt adhesive, and may further include a plurality of ceramic microspheres. Methods of manufacture are also provided in which a solvent-free texture layer composition is applied to a substrate and then solidified to form a texture layer. In some non-limiting embodiments, the texture layer composition includes a hot melt adhesive and is applied to the substrate in the form of a wetted cellulose sponge.

10 Claims, 4 Drawing Sheets

(52) U.S. Cl.
CPC ..... *B32B 2255/26* (2013.01); *B32B 2264/107* (2013.01); *B32B 2266/02* (2013.01); *B32B 2307/4023* (2013.01); *B32B 2432/00* (2013.01)

(58) Field of Classification Search
USPC .......................................................... 428/200
See application file for complete search history.

(56) References Cited

U.S. PATENT DOCUMENTS

| | | | |
|---|---|---|---|
| 3,050,738 A | | 8/1962 | Rytina |
| 3,121,249 A | | 2/1964 | Affleck |
| 3,230,064 A | | 1/1966 | Veatch |
| 3,350,735 A | * | 11/1967 | Pratt ....................... A47L 17/08 |
| | | | 156/290 |
| 3,355,272 A | | 11/1967 | D'Alessandro |
| 3,365,315 A | | 1/1968 | Beck |
| 3,709,706 A | | 1/1973 | Sowman |
| 3,857,133 A | | 12/1974 | Linenfelser |
| 4,142,334 A | | 3/1979 | Kirsch |
| 4,166,147 A | | 8/1979 | Lange |
| 4,391,646 A | | 7/1983 | Howell |
| 4,767,726 A | | 8/1988 | Marshall |
| 5,213,588 A | | 5/1993 | Wong |
| 5,738,695 A | | 4/1998 | Harmer |
| 5,836,034 A | | 11/1998 | Galvan Garza |
| 5,849,852 A | | 12/1998 | Koch |
| 5,853,863 A | | 12/1998 | Kim |
| 5,905,099 A | | 5/1999 | Everaerts |
| 5,906,873 A | | 5/1999 | Kim |
| 6,087,279 A | | 7/2000 | Laun |
| 6,159,590 A | | 12/2000 | Kim |
| 6,783,562 B2 | | 8/2004 | Smith |
| 6,962,739 B1 | | 11/2005 | Kim |
| 7,008,680 B2 | | 3/2006 | Everaerts |
| 7,018,692 B2 | | 3/2006 | Kim |
| 7,132,377 B2 | | 11/2006 | Borgonjon |
| 7,232,794 B2 | | 6/2007 | Huyhn |
| 7,480,956 B2 | | 1/2009 | Policicchio |
| 7,504,145 B2 | | 3/2009 | Vance |
| 7,690,069 B2 | | 4/2010 | Chen |
| 7,829,478 B2 | | 11/2010 | Johnson |
| 8,343,882 B2 | | 1/2013 | Johnson |
| 8,516,858 B1 | | 8/2013 | Costello |
| 8,578,549 B2 | | 11/2013 | Adams |
| 8,821,979 B2 | | 9/2014 | Van Mil |
| 2002/0146956 A1 | | 10/2002 | Ngai |
| 2003/0121530 A1 | | 7/2003 | Borgonjon |
| 2003/0124935 A1 | | 7/2003 | Smith |
| 2003/0134063 A1 | | 7/2003 | Vance |
| 2003/0228813 A1 | | 12/2003 | Johnson |
| 2004/0093679 A1 | | 5/2004 | Kukoff |
| 2004/0111817 A1 | | 6/2004 | Chen |
| 2004/0147425 A1 | | 7/2004 | Castro |
| 2004/0175546 A1 | | 9/2004 | Shacklett |
| 2005/0009429 A1 | | 1/2005 | Park |
| 2005/0160543 A1 | | 7/2005 | Catalfamo |
| 2005/0164901 A1 | | 7/2005 | Foley |
| 2005/0260390 A1 | | 11/2005 | Croft |
| 2006/0122049 A1 | | 6/2006 | Marshall |
| 2006/0177488 A1 | | 8/2006 | Caruso |
| 2006/0213535 A1 | | 9/2006 | Porticos |
| 2006/0272115 A1 | | 12/2006 | Kacher |
| 2006/0286884 A1 | | 12/2006 | Thioliere |
| 2007/0107155 A1 | | 5/2007 | Kacher |
| 2007/0130713 A1 | | 6/2007 | Chen |
| 2007/0135006 A1 | | 6/2007 | Michaels |
| 2007/0166488 A1 | * | 7/2007 | Trefethren .............. A47L 17/08 |
| | | | 428/34.1 |
| 2007/0212965 A1 | | 9/2007 | Smith |
| 2007/0221247 A1 | | 9/2007 | Duda |
| 2007/0271719 A1 | | 11/2007 | Schindler |
| 2008/0047089 A1 | | 2/2008 | Sadovsky |
| 2008/0178366 A1 | | 7/2008 | Daher |
| 2008/0206526 A1 | | 8/2008 | Kim |
| 2008/0282455 A1 | | 11/2008 | Jones |
| 2009/0007313 A1 | | 1/2009 | Boorsma |
| 2009/0038101 A1 | | 2/2009 | Duda |
| 2009/0094772 A1 | | 4/2009 | Lee |
| 2009/0142535 A1 | | 6/2009 | Kim |
| 2010/0158697 A1 | | 6/2010 | Kim |
| 2011/0040016 A1 | | 2/2011 | Yakulis, Jr. |
| 2011/0168003 A1 | | 7/2011 | Kim |
| 2012/0325402 A1 | | 12/2012 | Suwa |
| 2013/0111682 A1 | | 5/2013 | Pung |
| 2013/0209735 A1 | | 8/2013 | Kim |
| 2021/0213701 A1 | * | 7/2021 | Corn ................... B32B 37/1207 |

FOREIGN PATENT DOCUMENTS

| | | |
|---|---|---|
| CN | 103479314 | 1/2014 |
| DE | 19851878 | 5/2000 |
| DE | 10 2008 051 317 | 10/2008 |
| DE | 10 2011 010 789 | 2/2011 |
| DE | 202015101364 | 4/2015 |
| EP | 0010408 | 2/1983 |
| EP | 0753280 | 8/1999 |
| EP | 1283019 | 10/2006 |
| EP | 1688080 | 8/2009 |
| EP | 1448085 | 7/2010 |
| ES | 262212 | 1/1961 |
| FR | 1406021 | 7/1965 |
| FR | 2956968 | 9/2011 |
| GB | 935286 | 8/1963 |
| GB | 1417293 | 12/1975 |
| JP | 3042449 | 10/1997 |
| JP | H10-046476 | 2/1998 |
| JP | 4782160 | 9/2011 |
| JP | 4819217 | 11/2011 |
| MX | PA03009577 | 4/2005 |
| WO | WO 1999-018282 | 4/1999 |
| WO | WO 2003-034889 | 5/2003 |
| WO | WO 2005-027706 | 3/2005 |
| WO | WO 2005-044177 | 5/2005 |
| WO | WO 2007-090570 | 8/2007 |
| WO | WO 2009-003530 | 1/2009 |
| WO | WO 2010-010046 | 1/2010 |
| WO | WO 2011-090721 | 7/2011 |
| WO | WO 2011-103466 | 8/2011 |
| WO | WO 2011-131333 | 10/2011 |
| WO | WO 2011-156735 | 12/2011 |
| WO | WO 2012-044907 | 4/2012 |
| WO | WO 2012-075314 | 6/2012 |
| WO | WO 2012-166664 | 12/2012 |
| WO | WO 2016-137706 | 9/2016 |
| WO | WO 2016-137707 | 9/2016 |
| WO | WO 2016-137708 | 9/2016 |
| WO | WO 2016-137712 | 9/2016 |

OTHER PUBLICATIONS

Drobny, Radiation Technology for Polymers, 68-96 (2003).
"Foams and Foam Control", Ullmann's Encyclopedia of Industrial Chemistry, 2012, vol. 15, pp. 571-598.
Hunter, "Foundations of Colloid Science", vol. 1, Oxford University Press, New York, 1987, 5 pages.
"Radiation Chemistry", Ullmann's Encyclopedia of Industrial Chemistry, 2012, pp. 1-34.
Singh, Radiation Processing of Polymers, 93-120.
International Search Report for PCT International Application No. PCT/US2017/018034, dated Sep. 6, 2017, 7 pages.

* cited by examiner

CONSUMER SCRUBBING ARTICLE WITH SOLVENT-FREE TEXTURE LAYER AND METHOD OF MAKING SAME

TECHNICAL FIELD

The present disclosure relates to a scrubbing article having a textured surface. More particularly, it relates to scrubbing articles having a texture layer formed on a solvent-free basis.

BACKGROUND

A variety of cleaning articles in the form of pads and wipes have been developed and made commercially available for household and industrial use. Consumers oftentimes desire to use the articles for cleaning or surface treating tasks requiring scrubbing that in turn may include various degrees of abrading and/or scouring. For example, it can be difficult, if not impossible, to remove dried food from a countertop using an inherently soft article. Conversely, however, consumers strongly prefer that the article not be overly rigid. In some cases, consumers thus desire that the article be drapeable for ease of use. Furthermore, consumers often desire a scrubbing pad or wipe that is not overly abrasive on relatively soft or easily scratched surfaces. In addition, consumers often find cleaning articles that are pre-loaded with a cleaning/disinfecting/sanitizing chemical or chemicals to be extremely useful and convenient.

Scrubbing articles have been developed to address some of the above-identified desires and concerns. For example, U.S. Pat. No. 7,829,478 to Johnson et al. describes a scrubbing wipe article including a nonwoven substrate and a texture layer. The texture layer is a non-crosslinked, abrasive resin-based material that is printed onto at least one surface of the nonwoven substrate. Johnson et al. teach that the texture layer composition is printed onto the substrate and then caused to coalesce to bond the composition to the substrate. Johnson et al. further describe that the resin constituent does not crosslink as part of the coalescing step and that coalescing represents a distinct advantage over other scrubbing wipe article forming techniques in which a lengthy curing period is required to achieve a sufficient hardness value. The scrubbing wipe article of Johnson et al. can be used "dry" or can be loaded with a chemical solution.

A variety of other scrubbing wipe articles have been suggested that include a texture layer formed on a substrate. In general terms, and as with the articles of Johnson et al., conventional constructions entail the use of solvent-based material as a primary component or base material of a texture layer composition that is initially applied to the substrate. While viable, and resulting in consumer-acceptable scrubbing articles, the manufacturing methods associated with these products may be less than optimal. The manufacturing methods must account for the removal of the solvent following application to the substrate. This, in turn, increases overall manufacturing time, and thus cost. Along these same lines, typical solvent removal processes are not conducive to in-line manufacture as the composition can be coated to a substrate web at a relatively fast line speed whereas many solvent removal techniques require the coated substrate to remain stationary or at best move at a relatively slow line speed. Further, the removed solvent must oftentimes be treated as a waste contaminant, again increasing the overall cost of manufacture.

Improvements in the properties of the scrubbing surface (e.g., an imparted texture layer) of a scrubbing article may be beneficial and therefore desirable. Likewise, as described above, improvements to the manufacturing processes of scrubbing articles can be advantageous. A need therefore exists for a scrubbing article that includes the benefits and advantages of a textured surface and conducive to streamlined, low cost manufacture.

SUMMARY

Some aspects of the present disclosure are directed toward a scrubbing article including a substrate and a texture layer. The texture layer is formed on at least one surface of the substrate, and is a solvent-free texture layer. As used throughout the present disclosure, the term "solvent-free" is defined to mean less than 1.0 wt. percent solvent, and the term "solvent" is defined to include organic solvents and water. In some embodiments, the texture layer includes a plastisol ink. In related embodiments, the plastisol ink is a primary base material of the texture layer. In other embodiments, the texture layer includes a hot melt adhesive. In related embodiments, the hot melt adhesive is a primary base material of the texture layer. In some embodiments, the texture layer includes a plurality of ceramic microspheres. In related embodiments, the texture layer includes a plastisol ink and a plurality of ceramic microspheres, or a hot melt adhesive and a plurality of ceramic microspheres. The substrate can assume various forms, and in some non-limiting embodiments is or includes a cellulose sponge; in related embodiments, the scrubbing article includes a hot melt adhesive-based texture layer applied to a cellulose sponge substrate. In some embodiments in which the substrate is a cellulostic sponge, the cellulostic sponge can have an average ultimate tensile strain of at least 20% or at least 30% or at least 50%.

Other aspects of the present disclosure are directed toward a method of manufacturing a scrubbing article. The method includes providing a substrate. A texture layer composition in flowable form onto a surface of the substrate. In this regard, a primary base material of the texture layer composition is solvent-free. The applied texture layer composition is solidified to form a texture layer secured to the substrate. In some embodiments, the texture layer composition include a primary base material comprising a plastisol ink; in related embodiments, the step of applying the texture layer composition includes mixing a polymer resin and plasticizer, and the step of solidifying includes heating the applied texture layer composition. In other embodiments, the texture layer composition includes a primary base material comprising a hot melt adhesive; in related embodiments, the method further includes heating the texture layer composition prior to the step of applying the texture layer composition. With some methods of the present disclosure, the step of applying includes slot coating the texture layer composition on to the substrate surface. In other embodiments, the step of applying includes printing the texture layer composition on to the substrate surface. In yet other embodiments, the texture layer composition includes a hot melt adhesive primary base component, the substrate is a cellulose sponge, and during the step of applying the texture layer composition, the cellulose sponge is wet.

BRIEF DESCRIPTION OF THE DRAWINGS

The disclosure may be more completely understood in consideration of the following detailed description of various embodiments of the disclosure in connection with the accompanying drawings, in which.

In the following detailed description, reference may be made to the accompanying set of drawings that form a part hereof and in which are shown by way of illustration several specific embodiments. It is to be understood that other embodiments are contemplated and may be made without departing from the scope or spirit of the present disclosure.

DETAILED DESCRIPTION

Figure 1:
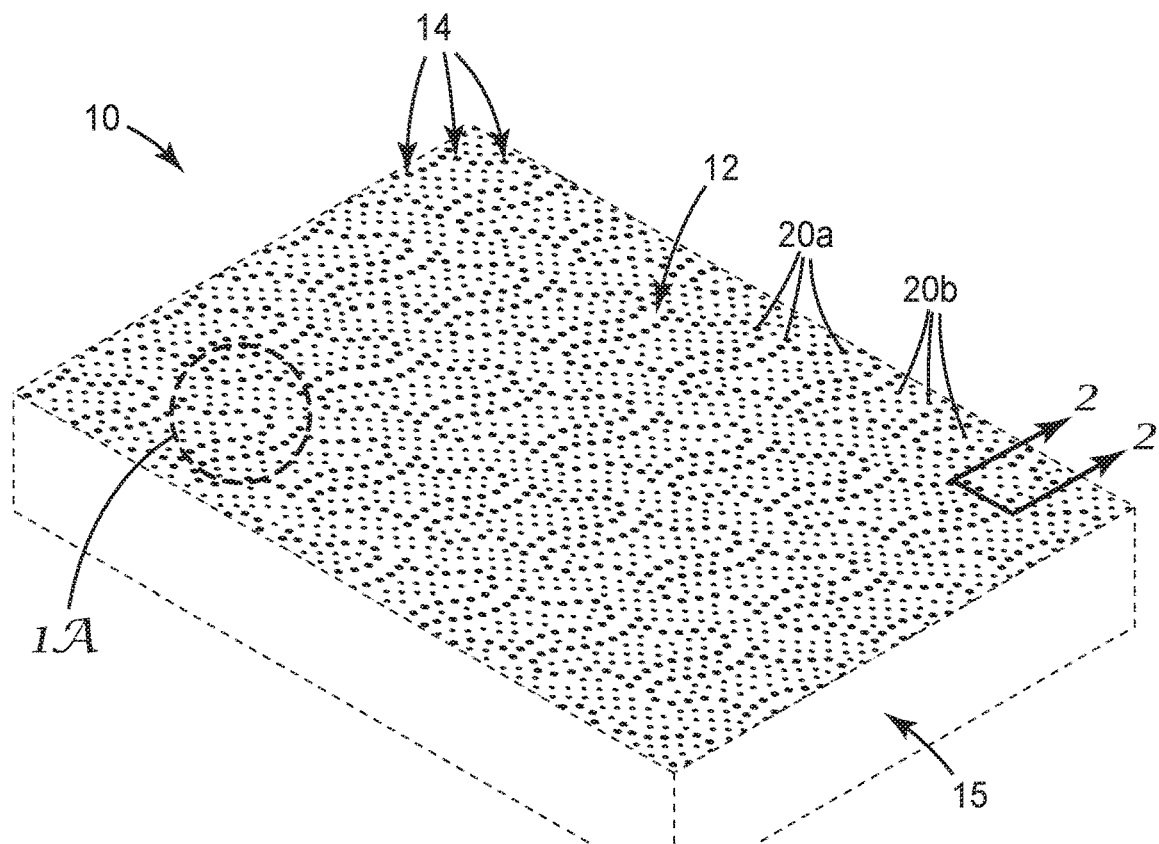
FIG. 1 is a perspective view of an exemplary scrubbing article in accordance with principles of the present disclosure.

FIG. 1 illustrates an embodiment of a scrubbing article 10 in accordance with the present disclosure. The scrubbing article 10 may be described as a consumer cleaning or scrubbing article 10. As used throughout the present disclosure, the term "consumer" is in reference to any household, cosmetic, industrial, hospital or food industry applications and the like of the article 10. Certain embodiments can be used as floor pads or hand pads, for example. Further as used throughout the present disclosure, the term "scrubbing" is used to describe surface treating and may include cleaning, abrading and/or scouring, including various levels or degrees of abrading and/or scouring action (e.g., heavy duty, non-scratch, etc.).

The article 10 comprises a substrate 12 and a texture layer 14 (referenced generally in FIG. 1). The substrate 12 and the texture layer 14 can comprise a variety of different materials as described in greater detail below. In general terms, the texture layer 14 is formed on and perhaps at least penetrates the substrate 12. As a point of reference, FIG. 1 further reflects that the scrubbing article 10 can optionally include one or more complimentary or auxiliary bodies 15 (drawn in phantom) to which the substrate 12 is attached. The substrate 12 and the auxiliary body 15 can be formed of differing materials (e.g., the substrate 12 is a thin nonwoven material and the auxiliary body 15 is a sponge). In other embodiments, the auxiliary body 15 is omitted. In one embodiment, the material includes all materials other than UV-curable materials.

Figure 2:
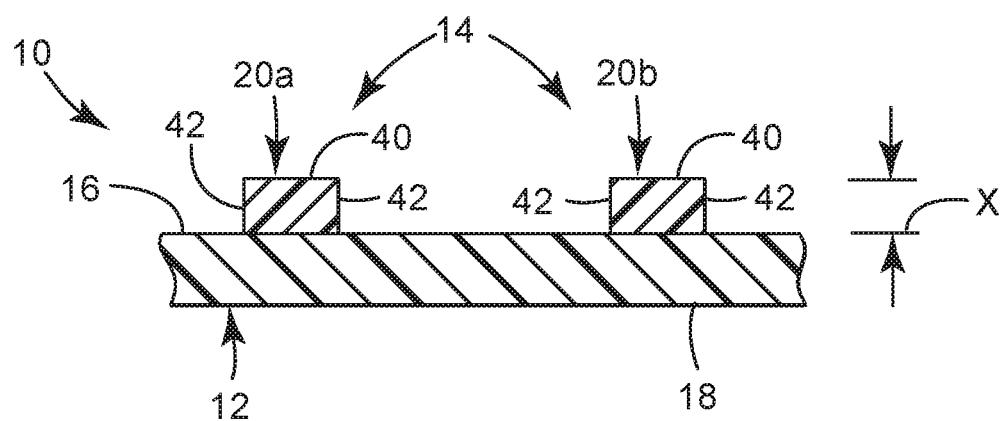
FIG. 2 is an enlarged, cross-sectional view of a portion of the article of FIG. 1 along the lines 2-2, shown in FIG. 1.

With additional reference to FIG. 2, the substrate 12 defines first and second opposing surfaces 16, 18. For purposes of illustration, thicknesses of the substrate 12 and the texture layer 14 may be exaggerated or understated in FIG. 2. The texture layer 14 can be formed on one or both of the substrate surfaces 16, 18. The texture layer 14 can also penetrate the corresponding substrate surface 16, 18 to some degree. In some embodiments, the scrubbing article 10 further includes a chemical solution (not shown) loaded into, or absorbed by, the substrate 12 and/or the optional auxiliary body 15. Applicable chemical solutions are likewise described in greater detail below. The texture layer 14 may be configured to accommodate a wide variety of chemical solutions including those that are neutral, cationic, or anionic. Further, the scrubbing article 10 is equally useful without a chemical solution.

Compositions of the substrate 12 and the texture layer 14, as well as processing thereof, are provided below. The scrubbing article 10 may be described as providing a "scrubbiness" attribute. The term "scrubbiness" is in reference to an ability to abrade or remove a relatively small, undesirable item otherwise affixed to a surface as the article is moved back and forth over the item. A substrate can be given a scrubbyness characteristic not only by forming a hardened scrubbing material on the substrate's surface (i.e., harder than the substrate 12 itself), but also and perhaps more prominently via the extent to which the so-formed material extends from or beyond the substrate surface in conjunction with side-to-side spacing between individual sections of the scrubbing material.

Figure 1A:
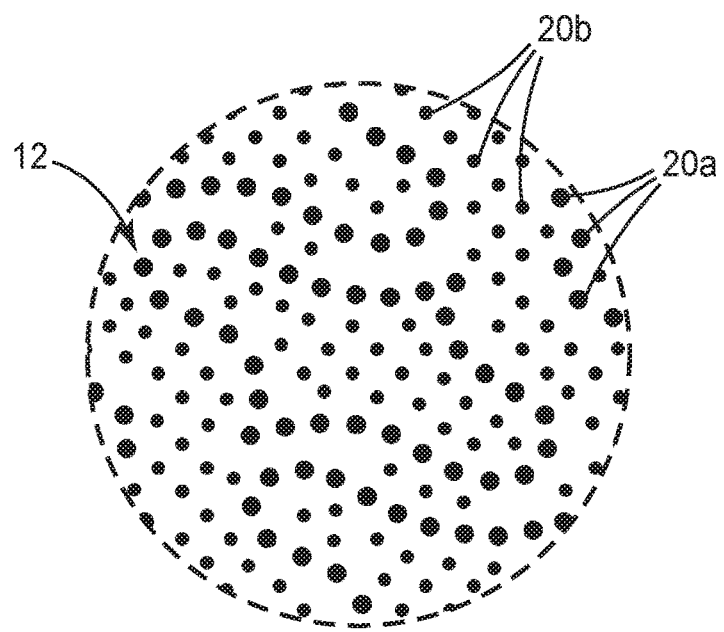
FIG. 1A is an enlarged plan view of a portion of the surface of the scrubbing article of FIG. 1.
Figure 5A:
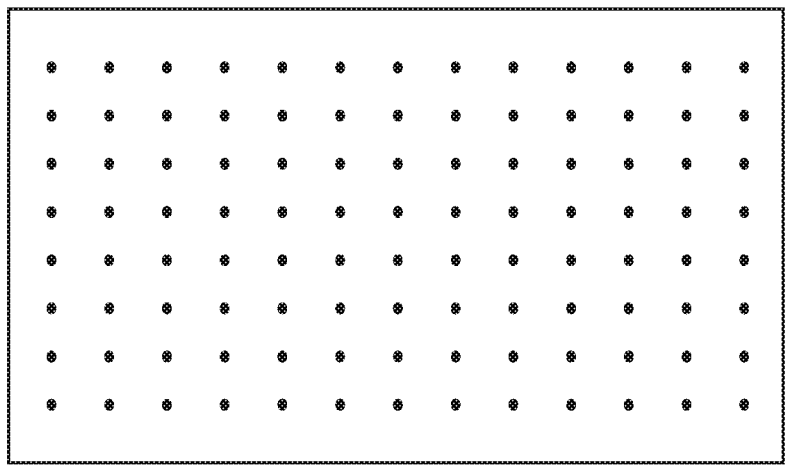
FIGS. 5A-5B are top views of alternative embodiments of a scrubbing article in accordance with principles of the present disclosure.
Figure 5B:
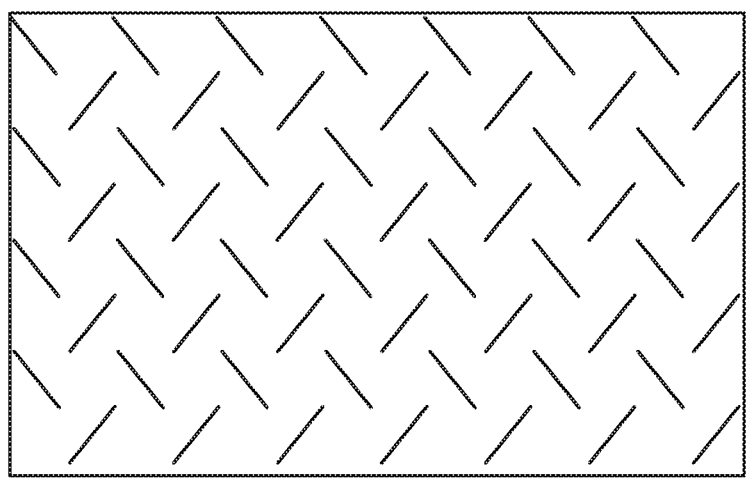

By way of further explanation, the texture layer 14 defines a plurality of discrete portions such as dots or islands (e.g., the various dots shown in FIG. 1 and referenced generally at 20a, 20b). Discrete portions 20a, 20b may form a randomly textured surface or may form a discernable pattern on the substrate surface 16. Further, discrete portions (e.g., 20a, 20b) may comprise varying relative sizes or may be substantially uniform in size. For instance, and as illustrated more clearly in FIG. 1A, dots 20a are relatively larger than dots 20b. As identified in FIG. 2, the discrete portions (e.g., 20a, 20b) each define a height X relative to the substrate surface 16. The discrete portions (e.g., 20a, 20b) may extend or project outwardly relative to the surface 16 at substantially uniform distances or, alternatively, may extend or project outwardly from the surface 16 at varying distances (i.e., the discrete portions 20a, 20b can have similar or varying heights with respect to the surface 16). In some embodiments, discrete portions (e.g., 20a, 20b) may extend to any distance in a range of about 10 to about 1000 microns outwardly from the surface 16. In other embodiments, discrete portions (e.g., 20a, 20b) may extend at least 10, at least 50, at least 500, or at least 1000 microns outwardly from the surface 16. In yet other embodiments described below, discrete portions (e.g., 20a, 20b) may extend more than 1000 microns from the surface 16, for example a distance or height X on the order of 1500-3000 microns. In still further embodiments, discrete portions (e.g., 20a, 20b) may extend to a distance of 10-20 microns or less outwardly from the surface 16. Regardless, a variety of texturings and/or patterns can be provided on the substrate 12. Alternative exemplary embodiments of patterns useful with the present disclosure are shown in FIGS. 5A-5B.

Figure 3:
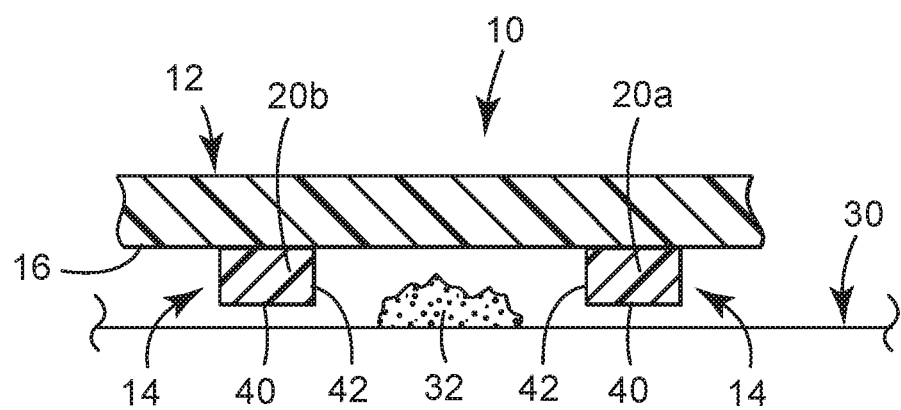
FIG. 3 is an enlarged, cross-sectional view of the article portion of FIG. 2 being applied to a surface.

Regardless of the pattern, design and/or extension distance of portions (e.g., 20a, 20b) from the surface 16, during a scrubbing application, a user (not shown) will normally position the scrubbing article 10 such that the texture layer 14 is facing the surface to be scrubbed. An example of this orientation is provided in FIG. 3 whereby the scrubbing article 10 is positioned to clean or otherwise treat a surface 30. As should be understood, the surface 30 to be cleaned is application specific, and can be relatively hard (e.g., a table top or cooking pan) or relatively soft (e.g., human skin, polymeric baking vessels, etc.). Regardless, in the exemplary embodiment of FIG. 3, the surface 30 to be scrubbed may have a mass 32 that is undesirably affixed thereto. Again, the mass 32 will be unique to the particular scrubbing application, but includes matters such as dirt, dried food, dried blood, etc. The scrubbing article 10 of the present disclosure facilitates scrubbing removal of the mass 32 as a user repeatedly forces the texture layer 14 (or a portion thereof) back and forth across the mass 32. Each section (for example, the sections 20a, 20b) of the texture layer 14 must be sufficiently hard to either abrade or entirely remove the mass 32 during the scrubbing motion. In addition, the texture layer 14 must extend an appreciable distance from the substrate major surface 16 to ensure intimate surface interaction with the mass 32 along not only an outer most surface 40, but along sides 42 as well. Portions 20a, 20b, while depicted as having uniform, sharp corners or edges (at the intersection of surface 40 and sides 42), may likewise or instead have rounded edges or corners or may be non-uniform in cross-section. What is important is that the extension of the texture layer 14 is such that the desired scrubbiness is achieved. Notably, many cleaning wipes incorporating a blown fiber "scrubbing" or texture layer provide only a minimal thickness or extension relative to the substrate surface, likely giving rise to a less than desirable scrubbiness characteristic. Further, it is preferred that the discrete portions (for example, the portions 20a, 20b) provided by the texture layer 14 of the present disclosure be sufficiently spaced from one another to ensure intimate contact between the mass 32 and the sidewall 42 of the particular texture layer portion 20a, 20b during a cleaning operation. Further still, it is desirable that the texture layer 14 has abrasion resistance such that the composition forming the texture layer 14 remains substantially intact on the substrate structure 12 during and after the article 10 is used to scrub the surface 30.

Substrates

The substrate 12 may be formed from a variety of materials and in a variety of forms. Any substrate material or combination of materials suitable for use as a consumer scrubbing article can be used including, without limitation, various nonwoven, fabric (e.g., woven or knitted), foam, sponge and film materials. The materials and forms of the substrate 12 can be selected to provide varying ranges of desired properties, such as extensibility, elasticity, durability, flexibility, printability, etc., that are particularly suited to a given scrubbing task and/or are particularly suited to depositing or forming a texture layer composition thereon. As indicated, materials useful for substrate 12 may be selected to have durability properties in a wide range. For example, the durability of materials suitable for use in scrubbing articles is often categorized as "disposable" (meaning that an article formed from the material is intended to be discarded immediately after use), "semi-disposable" (meaning that an article formed from the material can be washed and re-used a limited number of times), or "reusable" (meaning that an article formed from the material is intended to be washed and re-used). As also indicated above, materials may be selected based upon their flexibility. Depending upon the application, consumers may prefer a relatively flexible, supple or drapable scrubbing article, whereas in other applications, consumers prefer a relatively more rigid article that still maintains some degree of flexibility. In applications where a relatively more supple scrubbing article is preferred (e.g., drapable), providing a more flexible substrate 12 allows the user to readily fold, squeeze, or otherwise manipulate the scrubbing article 10 in a manner most appropriate for the particular scrubbing task. The desired suppleness of the substrate 12 can be characterized by reference to a dry basis weight thereof. With optional embodiments in which the substrate 12 is a nonwoven material, the nonwoven substrate 12 can have a dry basis weight of less than about 300 g/m$^2$, alternatively less than about 200 g/m$^2$, and greater than about 30 g/m$^2$. "Drapability" is defined as the inherent ability to conform to an irregular or non-flat surface. Alternatively, the suppleness of the substrate 12 can be expressed in terms of drapability. Drapability or "drape" is measured using IVDA standard for "Handle-O-Meter Stiffness of Nonwoven Fabrics" IST 90.3 (95). With this in mind, the nonwoven versions of the substrate 12 can have a drapability value of less than about 250 in some embodiments. In other embodiments for scrubbing applications where a relatively stiffer, yet still flexible substrate is desired, the substrate 12 may be formed of a composition and into a form that substantially holds its shape both when held lightly by a user or when placed on an irregular surface.

Some exemplary substrates 12 will now be described, however, a wide variety of materials may be used for the substrate 12, as noted above. Further, certain substrate constructions may be more beneficial with certain compositions of the texture layer 14 as described below. Exemplary fabrics useful with the present disclosure include knitted fabrics, such as a knitted fabric prepared from 82% poly (ethylene terephthalate) and 18% polyamide 6 fibers having a thickness in a range of 0.45-0.75 mm and a unit weight of 160 grams per square meter. Another exemplary fabric is described in U.S. Provisional Patent Application Ser. No. 62/121,808, entitled, "Multipurpose Consumer Scrubbing Cloths and Methods of Making Same" filed on Feb. 27, 2015, and incorporated by referenced herein in its entirety.

In other embodiments, the substrate 12 can be or can include a nonwoven material or web. With nonwoven embodiments, and in most general terms, the substrate 12 is comprised of individual fibers entangled with one another (and optionally bonded) in a desired fashion. The fibers are preferably synthetic or manufactured, but may include natural materials such as wood pulp fiber. As used herein, the term "fiber" includes fibers of indefinite length (e.g., filaments) and fibers of discrete length (e.g., staple fibers). The fibers used in connection with a nonwoven version of the substrate 12 may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers of the same polymer class (e.g., nylon) but which differ in their properties or characteristics. The term "multicomponent fiber" is thus intended to include, but is not limited to, concentric and eccentric sheath-fiber structures, symmetric and asymmetric side-by-side fiber structures, island-in-sea fiber structures, pie wedge fiber structures, and hollow fibers of these configurations.

In addition to the availability of a wide variety of different types of fibers useful for a nonwoven version of the substrate 12, the technique for bonding the fibers to one another is also extensive. In general terms, suitable processes for making a nonwoven version of the substrate 12 that may be used in connection with some embodiments of the present disclosure include, but are not limited to, spunbond, blown microfiber (BMF), thermal bonded, wet laid, air laid, resin bonded, spunlaced, ultrasonically bonded, etc. In some embodiments, the nonwoven version of the substrate 12 is spunlaced utilizing a fiber sized in accordance with known spunlace processing techniques. With this manufacturing technique, one optional construction of the nonwoven version of the substrate 12 is a blend of 50/50 wt. % 1.5 denier polyester and 1.5 denier rayon at 50-60 g/m$^2$. The nonwoven substrate 12 is first carded and then entangled via high-pressure water jets as is known in the art. The spunlace technique eliminates the need for a thermal resin bonding component, so that the resulting nonwoven substrate is amenable to being loaded with virtually any type of chemical solution (e.g., anionic, cationic, non-ionic, or amphoteric) or water. Other nonwoven constructions and methods of manufacture are equally acceptable and can include, for example, a thermally point-bonded spunbond poly(ethylene terephthalate) nonwoven wipe.

In other embodiments, the substrate 12 is or includes a foam. An example foam useful with the present disclosure as, or as part of, the substrate 12 is a polyurethane foam having relatively non-porous top and bottom surfaces, commercially available under the trade designation of "TEXTURED SURFACE FOAM, POLYETHER, M-100SF" from Aearo Technologies, LLC, Newark, Del., USA.

In other embodiments, the substrate 12 is or includes a sponge. Exemplary sponges useful with the present disclosure are the cellulose sponges commercially available under the trade designations "SCOTCH-BRITE Stay Clean Non-Scratch Scrubbing Dish Cloth" (having catalog number 9033-Q) and "SCOTCH-BRITE Stay Clean Non-Scratch Scrub Sponge" (catalog number of 20202-12), both from 3M Company, St. Paul, Minn., USA.

In yet other embodiments, the substrate 12 is or includes a film, such as single layer or multi-layered polymer films made by extrusion, solvent casting, calendaring, stretching (e.g., via a tenter or stretching frame) and by other customary polymer processing method, are useful with the present disclosure. Some exemplary films include a plastic film made of melt-extruded, biaxially oriented and primed poly(ethylene terephthalate), polyolefin films, elastomeric films made of physically and chemically cross-linked elastomers, films made of vinyl monomers, such as poly(vinyl chloride), poly(vinylidene chloride) (which is commonly known under the trade designation "SARAN" or "SARAN WRAP" from S.C. Johnson & Son of Racine, Wis.), fluoropolymers, such as poly(vinylidene fluoride), silicones, polyurethanes, polyamides, poly(lactic acid), and combinations thereof.

Other fabrics, sponges, foams, films, wovens and nonwovens are likewise contemplated and the above examples are not meant to be limiting. In yet other embodiments, the substrate 12 can be or include a metal foil, flocked substrate, etc. Regardless of the exact construction, however, the substrate 12 is highly conducive to handling by a user otherwise using the article 10 for scrubbing purposes and is selected having regard to the intended use of the scrubbing article 10.

Although the substrate 12 is depicted in the cross-sectional view of FIG. 2 as a single layer structure, it should be understood that the substrate 12 may be of single or multi-layer construction. If a multi-layered construction is used, it will be understood that the various layers may have the same or different properties, constructions, etc., as is known in the art. For example, in one alternative embodiment, the substrate 12 is constructed of a first layer of 1.5 denier rayon and a second layer of 32 denier polypropylene. This alternative construction provides a relatively soft substrate, such that the resulting scrubbing article 10 is conducive for use cleaning a user's skin, akin to a facial cleansing wipe. In yet other embodiments, as mentioned above with respect to the optional auxiliary body 15 of FIG. 1, the substrate 12 can be connected or attached to a number of other substrate bodies presenting beneficial cleaning or handling properties.

Texture Layer Compositions

As discussed above, the texture layer 14 is an abrasive composition that is imparted to the substrate 12. The exact composition of the texture layer 14 can vary depending upon desired end performance characteristics. To this end, a texture layer composition is initially formulated, and then deposited or formed on the substrate 12, and then solidifies (active or passive) to complete the texture layer 14, for example as a patterned, three-dimensional coating on the substrate 12. As a point of reference, the "texture layer composition" (or a "texture layer matrix") means the components or ingredients upon final mixing and before application or formation (e.g., printing, coating, embossing, etc.) at the substrate 12. The "texture layer precursor" is in reference to the texture layer composition immediately after formation at the substrate 12 and prior to solidification. The "texture layer" (i.e., the texture layer 14) means the formed or imparted texture layer following solidification, including following post-formation processing (e.g., heat, UV, e-beam, etc.) if any.

The texture layer compositions according to the present disclosure will include a selected primary base material and may include additional constituents such as glass bubbles, ceramic microparticles, mineral(s), filler(s), colorant(s), thickener(s), defoaming agent(s), surfactant(s), soaps, or other cleaning/disinfecting/sanitizing agents, etc. The texture layer 14 may optionally be e-beam treatable/treated and may include compositions such as described in U.S. Provisional Patent Application Ser. No. 62/121,766, entitled "Scrubbing Article and Method of Making Same" filed on Feb. 27, 2015 and incorporated by reference herein in its entirety. Alternately, the texture layer 14 may be UV treatable/treated or crosslinked and may include compositions such as described in U.S. Provisional Patent Application Ser. No. 62/121,705, entitled, "UV Treated Scrubbing Articles and Methods of Making Same" filed on Feb. 27, 2015 and incorporated by reference herein in its entirety. Regardless of the exact composition, the texture layer 14 imparts desired manufacturability, scrubbiness, durability, hardness, and abrasion resistance to the scrubbing article 10.

Various materials are suitable as the primary base material of the texture layer composition that ultimately forms the texture layer 14, providing adhesion to and projection from the substrate surface once hardened. In more general terms, the primary base materials of the present disclosure are solvent-free or 100% solids. As used throughout this disclosure, the term "solvent-free" is defined as meaning less than 1.0 wt. percent solvent, and the term "solvent" is defined to include organic solvents and water.

For example, in some embodiments, the primary base material is a plastisol ink. In other embodiments, the primary base material is a hot melt adhesive. These non-limiting primary base materials are described in greater detail below, along with optional additives useful with the primary base material as part of the texture layer composition.

The particular primary base material and weight percent relative to the texture layer composition can be fine-tuned to satisfy the desired end application constraints. However, the selected primary base material is characterized as being flowable in matrix form in a manner that will soak only partially, if at all, into the substrate 12 (i.e., will not soak through or wet out the substrate 12) upon forming thereon, and will harden, cure or coalesce optionally upon exposure to various conditions (e.g., heat, e-beam, etc.). Additionally, the primary base material component of the texture layer 14 is optionally non-ionic in some embodiments. The non-ionic nature of the primary base material facilitates use of virtually any form of chemical solution with the scrubbing article 10 where so desired.

A1. Primary Base Material: Plastisol Ink

In some embodiments, the primary base material of the texture layer composition (and thus of the resultant texture layer 14) is a plastisol or plastisol ink. Plastisol inks are 100% solid solutions of resin (e.g., vinyl chloride or (meth) acrylate polymers) and liquid plasticizer that mutually dissolve into each other at elevated temperatures (e.g., 290° F.-310° F. (143° C.-155° C.) for 2-3 minutes), creating a solid coating. Upon cooling, a flexible, permanently plasticized product results; no solvent or water is evaporated. The plastisol inks useful as the primary base material of the texture layer compositions of the present disclosure are stable, pourable, cream-like dispersions of the select resin powder (e.g., polyvinyl chloride) in a plasticizer. When the plastisol solution is heated above the glass transition temperature of the resin, the resin is solvated by diffusion of the plasticizer and the particles in dispersion fuse (fluxing) into a rubbery plastic mass. Further heating above the melting temperature of the resin creates a homogenous melt and ultimate strength when cooled to form a solid (curing). The solid is typically tough and elastic.

Plastisol inks are commonly used in applications other than scrubbing articles, typically to print designs on fabrics such as T-shirts, shopping bags, etc.

The resin component of the plastisol ink can be any type known to those of ordinary skill. For example, the plastisol ink resin can be polyvinyl chloride (PVC), methacrylate polymers, etc. PVC, for example, can be synthesized by either emulsion (dispersion) polymerization to produce very fine particles (paste grade PVC) or by suspension polymerization to produce larger sized particles (dry blending grade PVC). The paste grade PVC is particularly useful for plastisols, and is used in higher concentrations than dry blending grade PVC. Vinyl polymers used in PVC plastisols are homo- and/or copolymers of vinyl chloride and other unsaturated compounds such as vinyl acetate, vinylidene chloride or vinyl propionate dispersed in a liquid plasticizer or mixture of plasticizers.

The plasticizer component of the plastisol ink can be any type known to those of ordinary skill. In general terms, the plasticizer is selected as a function of the selected plastisol ink resin, and is formulated so that the plasticizer wets the resin particle at room temperature but only very slowly penetrates and solvates the resin. Upon heating, the plastisol ink fuses to provide a well plasticized resin. Plasticizers suitable for polyvinyl chloride resin (and other plastisol ink resin compositions) can be selected from adipates, sebacates, benzoates, phosphates, phthalates, isophthalates, terephthalates and polyesters. Typically, phthalate type plasticizers are combined with an epoxy such as epoxidised soybean oil that has heat and light stabilizing properties. Other examples of plasticizers suitable for use with polyvinyl chloride resin (and other plastisol ink resin compositions) generally are low viscosity, organic esters, for example, dioctyl phthalate, di-2-ethylhexyl phthalate, diisononyl phthalate, and triphenyl or diphenyl alkyl phosphate, and generally are 100% solids systems. Examples of such plasticizers useful for forming a plastisol ink with the halogenated polymer, such as polyvinyl chloride, include, for example, a diisononyl phthalate plasticizer, commercially available from Exxon Chemical Co., Houston, Tex., and a diphenyl alkyl phosphate plasticizer, commercially available from Monsanto Co., St. Louis, Mo., under the trade designation "Santicizer 141". These systems generally do not require an organic solvent and the total cure or fusion time is very short since no volatile solvents have to be removed prior to curing or fusion.

In addition to resin and plasticizer, the plastisol inks of the present disclosure optionally contain pigments such as titanium dioxide, and fillers, such as fumed silica, calcium carbonate, and the like. Moreover, the texture layer composition incorporating the plastisol ink as the primary base material can include one or more additional additives as described below. One particular additive useful with plastisol ink-based texture layer compositions of the present disclosure is ceramic microparticles. In some embodiments, the plastisol inks and corresponding texture layer compositions are free of an inorganic phosphate additive.

A2. Primary Base Material—Hot Melt Adhesive

In some embodiments, the primary base material of the texture layer composition (and thus of the resultant texture layer 14) is a hot melt adhesive. Hot melt adhesives, also known as hot glue, are well known and are a form of thermoplastic adhesive. The hot melt adhesive useful as the primary base material can be formulated to be either reactive (e.g., moisture cured polyurethane) or non-reactive (e.g., non-reactive ethylene vinyl acetate hot melt, non-reactive polypropylene hot melt, etc.). Appropriate hot melt adhesives have the ability to flow when they are heated to a temperature above their crystalline melting temperature, $T_m$, and/or above their glass transition temperature, $T_g$. Once cooled back to a temperature below their $T_m$ and/or $T_g$, the hot melt adhesive solidifies and provides adhesive properties. The hot melt adhesive as incorporated into the texture layer composition is solvent-free. The hot melt adhesive may include at least one of a polyurethane, polyamide, polyester, polyacrylate, polyolefin, polycarbonate and epoxy resin. The hot melt adhesive may be capable of being cured. Curing the hot melt adhesive may comprise at least one of moisture curing, thermal curing and actinic radiation curing. Heat activated adhesives may include the adhesives disclosed in U.S. Pat. Publ. No. 2012/0325402 (Suwa, et. al.) and U.S. Pat. No. 7,008,680 (Everaerts, et. al.) and U.S. Pat. No. 5,905,099 (Everaerts, et. al.), all incorporated herein by reference. Hot melt adhesives are commonly used to adhere two substrates to one another.

The hot melt adhesive useful as the primary base material of the texture layer compositions of the present disclosure may consist of one base component with various additives. The base component is typically a polymer, and the additive includes a tackifier. In addition to polymer and tackifier, the hot melt adhesives of the present disclosure optionally contain fillers (e.g., calcium carbonate, amorphous silica, etc.), colorants (e.g., dyes, pigments, etc.), and the like. Moreover, the texture layer composition incorporating the hot melt adhesive as the primary base material can include one or more additional additives as described below. One particular additive useful with hot melt adhesive-based texture layer compositions of the present disclosure is ceramic microparticles; abrasive minerals are another category of additive particularly useful with the hot melt adhesive as part of a texture layer composition and the resultant texture layer 14.

Texture layer compositions including a hot melt adhesive as the primary base component can be utilized with any of the substrate materials described above in forming a viable scrubbing article 10. One particular, but non-limiting, format of the substrate 12 with which the hot melt adhesive-based texture layer composition is surprisingly useful is a sponge, and in particular a cellulose sponge that is made in a wet process and (to maintain flexibility) provided to an end user in a moist (e.g., approximately 50% water, by weight) state. It has surprisingly been found that a texture layer composition utilizing a hot melt adhesive (e.g., a moisture-reactive hot melt adhesive) as the primary base material can be applied to a moist or wet cellulose sponge as the substrate 12, and generates a texture layer 14 viable for use in scrubbing applications upon solidification.

B. Optional Additives

Regardless of the format of the selected primary base material (e.g., plastisol ink or hot melt adhesive), the texture layer compositions and resultant texture layers of the present disclosure can further include one or more of the additives below.

In some embodiments, the composition of the texture layer 14 may include ceramic microparticles and related processing agents as described in U.S. Provisional Patent Application Ser. No. 62/121,644, entitled, "Consumer Scrubbing Article with Ceramic Microparticles and Method of Making Same" filed on Feb. 27, 2015 and incorporated by referenced herein in its entirety.

In some embodiments, the texture layer 14 optionally further includes a particulate additive (apart from or in addition to the ceramic microparticles mentioned above) for enhanced hardness. To this end, the scrubbing article 10 of the present disclosure is useful in a wide variety of potential applications having different scrubbing requirements. For some applications, it is desirable that the scrubbing article 10, and in particular the texture layer 14, be more or less abrasive than others. While the above-described primary base material of the texture layer 14 independently imparts a scrubbiness feature to the article 10 greater than other available scrubbing articles, this scrubbiness characteristic can be further enhanced via the addition of a particulate component. With this in mind, a wide variety of minerals or fillers as known in the art can be employed. Useful minerals include $Al_2O_3$, "Minex" (available from The Cary Co. of Addison, Ill.), $SiO_2$, $TiO_2$, etc. Exemplary fillers include $CaCO_3$, talc, etc. Where employed, the particulate component additive comprises less than 70% by weight of the texture layer 14, more preferably less than 50% by weight, most preferably less than 30% by weight. Further, the particulate component may consist of inorganic, hard, and small particles. For example, the "Minex" mineral particulate component has a median particle size of 2 microns and a Knoop hardness of about 560. Of course, other particle size and hardness values may also be useful. The inorganic nature of the particulate component, in conjunction with the non-ionic resin component, renders the resulting texture layer 14 amenable for use with any type of chemical solution.

As indicated above, the texture layer composition may optionally include additional constituents, such as process agents or aids. Materials may be selected to have molecular weights or viscosities allowing the texture layer composition or matrix to be flowable in a manner that will fill the holes or voids of a stencil pattern (for example) during transfer of the texture layer composition to the substrate 12, sufficiently adhere to the substrate 12, and to hold the desired pattern shape upon removal of the stencil (or other body) from the substrate 12 even prior to subsequent processing steps (if any). Other optional additives can include those perhaps more appropriate for use with plastisol ink embodiments of the present disclosure. For example, an optional additive can be included to reduce dye bleed (color change to the substrate being printed). Also, optional adhesion promoters can be included (e.g., catalysts that are useful for improving adhesion of the plastisol to nylon substrates, for example). Non-limiting examples include vinylimidazoles and polyaminoamides that can be useful as an adhesion promotor for methacrylate plastisols. Additional optional additives useful, for example, with plastisol ink embodiments include heat stabilizers and organosilicon liquids to reduce surface tension and facilitate removal of air bubbles.

In addition, an initiator, a promoter, or a retardant can optionally be provided as part of the formulation or composition of texture layer 14, according to some embodiments of the present disclosure, as described in detail in Provisional Patent Application Ser. No. 62/121,766, incorporated by reference herein above.

The texture layer composition can include a colorant (e.g., dye or pigment) additive to provide a desired aesthetic appeal to the scrubbing article 10. Appropriate pigments are well known in the art, and include, for example, products sold under the trade designation "SUNSPERSE" from Sun Chemical Corp. of Amelia, Ohio. Other coloring agents (dye or pigment) as known in the art are equally acceptable (e.g., $TiO_2$, carbon black, etc.) and in some embodiments comprise less than 10% of the texture layer composition by weight.

Finally, and as previously described, the scrubbing article 10 of the present disclosure can be used "dry" or can be loaded with a chemical (solution or solid) for disinfecting, sanitizing or cleaning (e.g., a soap). The term "loaded" is in reference to a chemical solution being absorbed by the substrate 12 (or an auxiliary body secured to the substrate 12) prior to being delivered to a user. In addition or alternatively, the chemical may be sprayed onto a surface of the cloth. In still further embodiments, a chemical may be provided in or as part of the texture layer 14 composition. Thus, deposited (e.g., printed) texture layer 14 may comprise printed soap scrubbing dots (e.g., 20a, 20b, FIG. 3). With these various constructions, during use, the chemical solution is released from the substrate 12 as the user wipes the scrubbing article 10 across a surface. Thus, in embodiments where the chemical is provided as part of the texture layer 14, the texture layer (i.e., scrubbing portions 20a, 20b) may gradually decrease in size as the chemical is consumed during a scrubbing application. Due to the optional non-ionic nature of the texture layer 14, virtually any desired chemical can be used, including water, soap, quaternary ammonium salt solutions, Lauricidin™-based anti-microbials, alcohol-based anti-microbials, citrus-based cleaners, solvent-based cleaners, cream polishes, anionic cleaners, amine oxides, etc. That is to say, where employed, the chemical solution can be anionic, cationic, or neutral.

Formation of the Scrubbing Article

Figure 4A:
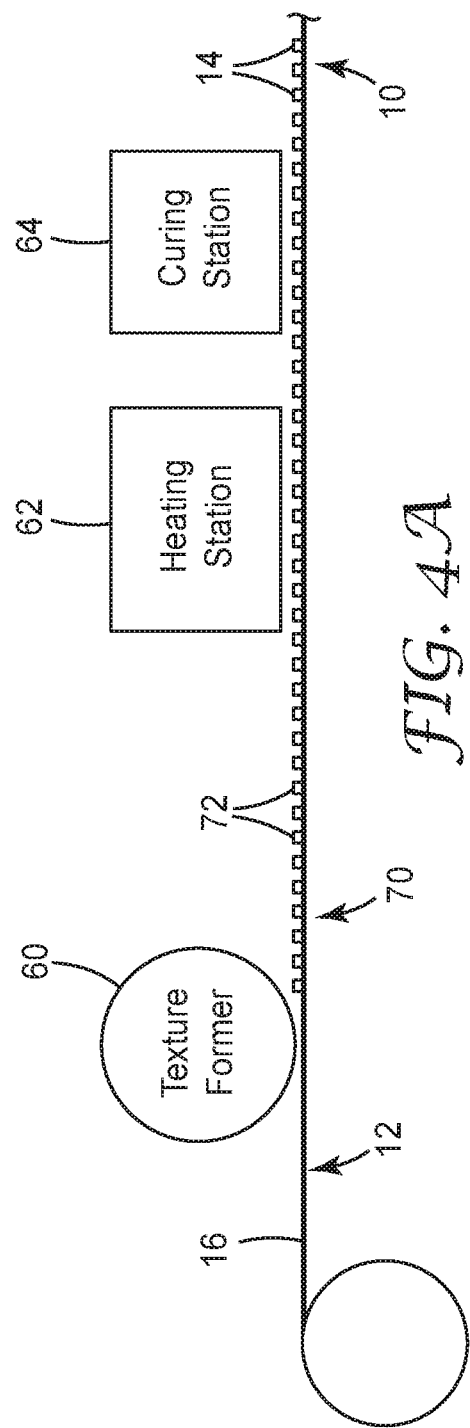
FIG. 4A is a simplified illustration of a method of manufacture in accordance with principles of the present disclosure.
Figure 4B:
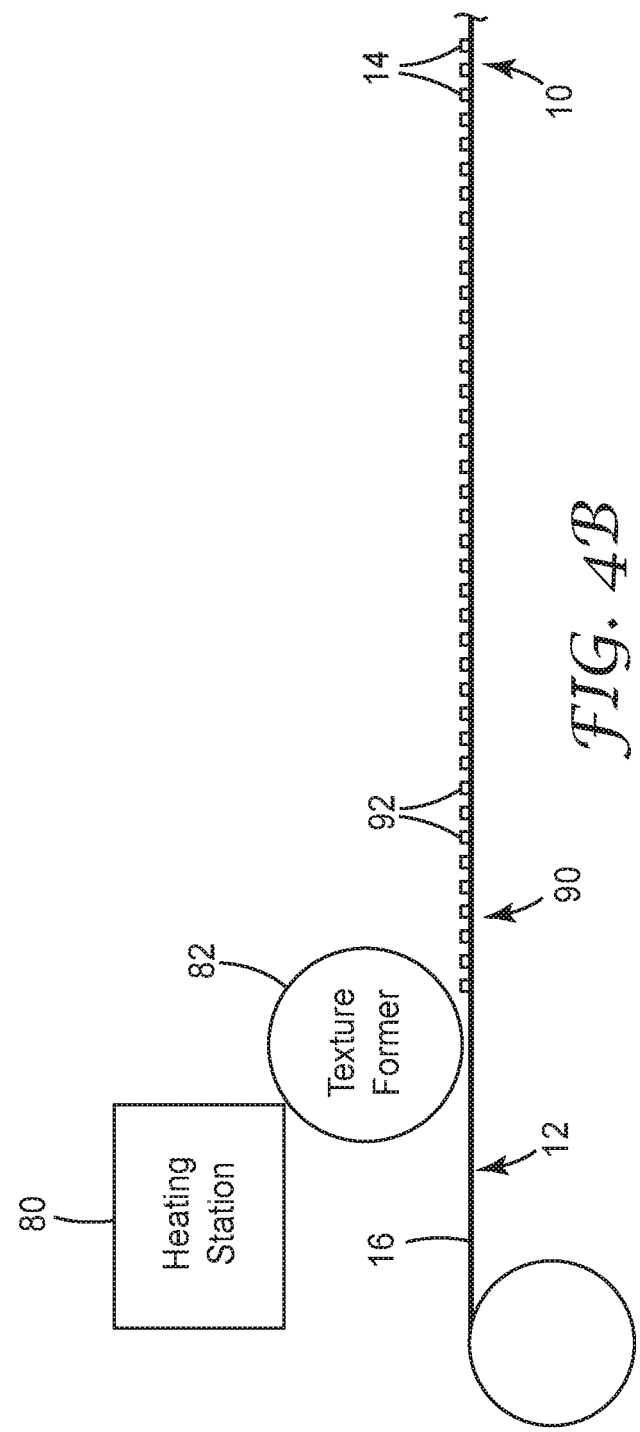
FIG. 4B is a simplified illustration of another method of manufacture in accordance with principles of the present disclosure.

Manufacture or formation of the scrubbing article 10 of the present disclosure is depicted in the simplified block form of FIGS. 4A and 4B, and generally includes preparing the substrate 12, formulating the appropriate texture layer composition, and then imparting the composition onto the substrate 12 (e.g., via printing, coating, etching, embossing, molding, etc.). As reflected by FIGS. 4A and 4B, portions or an entirety of some methods of the present disclosure are continuous or in-line. For example, a web of the substrate 12 can be prepared in a first operation, with a continuous web of the substrate 12 later being conveyed through other processing stations to effectuate imparting of the texture layer 14.

As described below, the systems and methods implicated by FIG. 4A reflect some embodiments of the present disclosure in which the texture layer composition, and thus the resultant texture layer 14, incorporates a plastisol ink as the primary base material. FIG. 4B reflects other embodiments in which the texture layer composition, and thus the resultant texture layer 14, incorporates a hot melt adhesive as the primary base material. With either primary base material type, some methods of the present disclosure benefit from the solvent-free feature of the texture layer composition. Because no solvent removal step or process is required, the methods implicated by FIGS. 4A and 4B are conducive to in-line manufacture and are less costly as compared to conventional techniques that require solvent removal devices. Further, the methods implicated by FIGS. 4A and 4B (and the corresponding descriptions) need not account for, or incur the corresponding costs of, waste contamination treatment or disposal, as there is no solvent removal step or process. Additionally, the artifacts or "holes" sometimes associated with printing of solvent-based texture layer compositions are avoided.

With the systems and methods of both FIGS. 4A and 4B, prior to forming the texture layer composition to the substrate 12, depending upon the type of substrate, the surface 16 (FIG. 2) of the substrate structure 12 may be primed. Priming may involve mechanical, chemical, physical and material application methods. For example, some surface priming methods that may be especially useful with the present disclosure include consolidating one side of a substrate with the use of heat and/or pressure, flame treating/melting, cutting or removing substrate material. Alternatively, priming may include application of a chemical primer such as an adhesive. Notably, however, for many substrates 12, no primer is necessary prior to transfer of the texture layer composition onto the substrate structure 12 to achieve adequate adhesion.

A. Methods of Manufacture Using Plastisol Ink Texture Layer Composition

With specific reference to FIG. 4A, with embodiments in which the texture layer composition incorporates a plastisol ink as the primary base material, the texture layer composition can be formed on the substrate 12 using a variety of known techniques appropriate for maintaining and applying the texture layer composition in flowable form, and can include printing (e.g., screen printing, gravure printing, flexographic printing, etc.), coating (e.g., roll, spray, electrostatic), etc. In general terms, and with reference to FIG. 4A, a texture former (of various types) 60 deposits or prints the texture layer composition onto the substrate 12 in any desired pattern, such as any of the various patterns described above. The texture former 60 can include, for example, a printer (e.g., screen printer), foamer, roll coater, spray coater, slot coater, etc. As one specific, non-limiting example, use of a printing method for imparting the texture layer 14 may be advantageous in that printing techniques can provide a relatively high-definition application of the texture layer composition. Some printing techniques may also afford relative ease of manufacture and lower cost as compared to other texture forming techniques described above. Regardless of the texture forming technique, as previously described, the texture layer 14 covers less than an entirety of the substrate surface on which it is formed (i.e., the surface 16 of FIG. 2) in some embodiments, and is preferably formed in a pattern including two or more discrete sections. In this regard, a wide variety of patterns can be formed. For example, the pattern can consist of a plurality of dots as shown in FIG. 1. Alternatively, the pattern can include two (or more) interconnected lines. In yet other embodiments, and with additional reference to FIGS. 5A-5B, the texture layer 14 consists of a plurality of discrete lines, dots, and/or images. Further, other desirable pattern components, such as a company logo, can be formed. Alternatively, a more random distribution of texture layer sections can be imparted to the structure 12. Virtually any pattern can be obtained. In yet other embodiments, the texture layer composition is coated (e.g., slot, bead, or curtain coating) over an entire substrate surface.

In some embodiments, the texture layer composition is sufficiently solidified and attached to the substrate 12 immediately after application and/or without post-printing processing. In other embodiments, including embodiments incorporating a plastisol ink in the texture layer composition, methods of the present disclosure can include further processing that promotes solidification and/or attachment of the texture layer composition. For ease of explanation, an interim scrubbing article 70 can be defined along a length of the continuous substrate 12 immediately downstream of the texture former 60 as identified in FIG. 4A, and generally includes a texture layer precursor 72 applied to the substrate 12.

With this in mind, and as identified in FIG. 4A, a heating station (e.g., oven) 62 is provided downstream of the texture former 60. The heating station 62 is configured to subject the interim scrubbing article 72 to heating conditions (e.g., temperature and dwell time) appropriate to plasticize the plastisol ink component (e.g., 290° F.-310° F. (143° C.-155° C.) for 2-3 minutes).

In some embodiments, the texture layer precursor 72 solidifies, cures, hardens, coalesces, or otherwise transitions to the final texture layer 14 and is sufficiently attached to the substrate 12 following processing at the heating station 62 without further active steps (i.e., the interim scrubbing article 70 is converted to the final scrubbing article 10 after processing by the heating station 62). In other embodiments, the interim scrubbing article 72 can be subjected to other processing steps. For example, subsequent processing of the interim scrubbing article 70 can optionally further include one or more curing stations 64 (e.g., oven, infrared light, etc.) located downstream of the heating station 62. The curing station 64 can be adapted to promote crosslinking or polymerizing, or both, of the texture layer composition formed thereon. For example, the station 64 can be configured to generate electron beam (e-beam) radiation that irradiates the texture layer precursor 72 of the interim scrubbing article 70 to thus forming the resultant scrubbing article 10. Optional e-beam radiation steps and corresponding texture layer compositions are described in U.S. Provisional Patent Application Ser. No. 62/121,766, entitled "Scrubbing Article and Method of Making Same" and U.S. Provisional Patent Application Ser. No. 62/121,705, entitled, "UV Treated Scrubbing Articles and Methods of Making Same", each filed on Feb. 27, 2015 and incorporated by reference herein in their respective entireties.

Regardless of the exact manufacturing methodology, it has surprisingly been found that with texture layer compositions incorporating a plastisol ink-based primary base material can be applied, printed or coated to the substrate 12 at levels or thicknesses that result in elevated texture layer heights as compared to conventional constructions. For example, with the methods described above and implicated by FIG. 4A, the resultant texture layer 14, patterned or uniform, can have a height in excess of 1000 microns.

B. Methods of Manufacture Using Hot Melt Adhesive Texture Layer Composition

With specific reference to FIG. 4B, with embodiments in which the texture layer composition incorporates a hot melt adhesive as the primary base material, the texture layer composition can be formed on the substrate 12 using a variety of known techniques appropriate for maintaining and applying the texture layer composition in flowable form, and can include printing (e.g., screen printing, gravure printing, flexographic printing, etc.), coating (e.g., roll, spray), for example extrusion coating, etc. In general terms, and with reference to FIG. 4B, a heating station 80 is provided with or as part of a texture former (of various types) 82. The heating station 80 (e.g., oven) operates to elevate a temperature of the texture layer composition sufficient to render the hot melt adhesive flowable. The flowable texture layer composition is provided to the texture former 82 that deposits or prints the texture layer onto the substrate structure 12 in any desired pattern, such as any of the various patterns described above.

The texture former 82 can include, for example, a printer (e.g., screen printer), foamer, roll coater, spray coater, slot coater, etc. As one specific, non-limiting example, use of a printing method for imparting the texture layer 14 may be advantageous in that printing techniques can provide a relatively high-definition application of the texture layer composition. Some printing techniques may also afford relative ease of manufacture and lower cost as compared to other texture forming techniques described above. Regardless of the texture forming technique, as previously described, the texture layer 14 covers less than an entirety of the substrate surface on which it is formed (i.e., the surface 16 of FIG. 2) in some embodiments, and is preferably formed in a pattern including two or more discrete sections. In this regard, a wide variety of patterns can be formed. For example, the pattern can consist of a plurality of dots as shown in FIG. 1. Alternatively, the pattern can include two (or more) interconnected lines. In yet other embodiments, and with additional reference to FIGS. 5A-5B, the texture layer 14 consists of a plurality of discrete lines, dots, and/or images. Further, other desirable pattern components, such as a company logo, can be formed. Alternatively, a more random distribution of texture layer sections can be imparted to the structure 12. Virtually any pattern can be obtained. In yet other embodiments, the texture layer composition is coated (e.g., slot, bead, or curtain coating) over an entire substrate surface.

For ease of explanation, an interim scrubbing article 90 can be defined along a length of the continuous substrate 12 immediately downstream of the texture former 82 as identified in FIG. 4B, and generally includes a texture layer precursor 92 applied to the substrate 12. Methods of the present disclosure then include subjecting the interim scrubbing article 90 to cooling conditions (e.g., room temperature) appropriate for the hot melt adhesive of the texture layer precursor 92 to solidify. In some embodiments, the texture layer precursor 92 solidifies, cures, hardens, coalesces, or otherwise transitions to the final texture layer 14 and is sufficiently attached to the substrate 12 following processing at the texture former 82 without further active steps (i.e., the interim scrubbing article 90 converts to the final scrubbing article 10 after a short dwell time downstream of the texture former 82). In other embodiments, the interim scrubbing article 90 can be subjected to other processing steps as described above.

In some non-limiting embodiments, with the methods of FIG. 4B (i.e., utilizing a hot melt adhesive-based texture layer composition), the substrate 12, as provided to the texture former 82, is moist or "wet". For example, the substrate 12 is a cellulose sponge that is moist or wet (e.g., approximately 50% water, by weight) as presented to the texture former 82. Under these circumstances, some methods of the present disclosure include applying, printing, or coating the hot melt adhesive-based texture layer composition on the moist or wet substrate 12. It has surprisingly been found that the hot melt adhesive-base texture layer composition will sufficient form and bond to the surface (e.g., the surface 16 of FIG. 2) of the moist or wet cellulose sponge substrate 12 with subsequent cooling/solidification.

Regardless of the exact manufacturing methodology, it has surprisingly been found that with texture layer compositions incorporating a hot melt adhesive-based primary base material can be applied, printed or coated to the substrate 12 at levels or thicknesses that result in elevated texture layer heights as compared to conventional constructions. For example, with the methods described above and implicated by FIG. 4B, the resultant texture layer 14, patterned or uniform, can have a height in excess of 2000 or even 3000 microns. As a point of reference, with hot melt adhesive-based texture layer compositions, a stencil or screen may not be required to form a desired pattern; thus, a height of the resultant texture layer is not limited to a thickness of a stencil or screen that might otherwise be required with other texture layer composition formats.

EXAMPLES

Objects and advantages of the present disclosure are further illustrated by the following non-limiting examples and comparative examples. The particular materials and amounts thereof recited in these examples, as well as other conditions and details, should not be construed to unduly limit the present disclosure.

Unless otherwise noted, all parts, percentages, ratios, etc. in the Examples and the rest of this specification are by weight. Unless otherwise noted, all composition amounts in the Examples are in grams.

The ultimate tensile strain values of the samples were determined according to the ASTM Standard Test Method for Tensile Properties of Plastics D638-14 with a type I specimen at a strain rate of 50 mm/min. A 20% reduction in the load was used as the tensile break criterion. The type I specimens were cut with the help of a die from the as received foam sheets. The first set of specimens were cut so that the long axis of the specimen was parallel to one of the edges of the as received foam sheet. The second set of specimens were cut so that the long axis of the specimens was perpendicular to the long axis of the specimens from the first set. At least 10 specimens were tested from each set. The arithmetic average of the ultimate tensile strain values of the specimens from the set was designated as the average ultimate tensile strain obtained from that set. For each set, the standard deviation was also calculated and observed to be relatively low (on the order of about 10%). Finally, the arithmetic average of the ultimate tensile strain values of the first and second sets was determined and reported as the average ultimate tensile strain of the foam sample.

Foam 4 contained a reinforcing net. These samples were horizontally skived with the help of a KWS Premium Commercial 420 W Electric Meat Slicer. The skived layer without the net was used in the tensile tests. So, the reported ultimate tensile strain for the Foam 4 was the ultimate tensile strain of the cellulose sponge component of the Foam 4 without the reinforcing net.

A. Plastisol Ink Examples

Abbreviations for materials and reagents used in the Plastisol Ink Examples are as follows:
Plastisol 1: White plastisol ink containing polyvinylchloride resin, plasticizer, titanium dioxide, calcium carbonate, fumed silica, and other materials, commercially available under the trade designation "Sportpro Phthalate free L1550WH" from Lancer Group International, Winnipeg, Manitoba, Canada.

Plastisol 2: Gray plastisol ink containing methacrylate resin, plasticizer, titanium dioxide, calcium carbonate, fumed silica, and other materials, commercially available under the trade designation "Evolution 2 NX Defender" from Lancer Group International, Winnipeg, Manitoba, Canada.

GB: 3M™ iM30K-N Hi-Strength Glass Bubbles with 193 MPa crush strength, 15 micron average diameter and 0.60 g/cm$^3$ true density, commercially available under the trade designation "3M iM16K-N Hi-Strength Glass Bubbles" from 3M Company, St. Paul, Minn.

CM: Hard, inert, solid, white-colored, fine ceramic spherical particles with a typical whiteness (L Value) of 95 or greater, a particle size of 10 μm, and a density of 1.5 g/cm$^3$, commercially available under the trade designation "3M W610 Ceramic Microspheres" from 3M Company, St. Paul, Minn.

Fabric: A knitted fabric prepared from 82% poly(ethylene terephthalate) and 18% polyamide 6 fibers, having a thickness in the range of 0.45-0.75 mm and a unit weight of 160 g/m$^2$.

Non-woven: Thermally point-bonded spun bond poly(ethylene terephthalate) non-woven wipe with a unit weight of 70 g/m$^2$.

Foam 1: Cellulose sponge cloth with a unit weight of 100 g/m$^2$, approximately 1 mm thick and with an average ultimate tensile strain of 60%, commercially available from Kalle GmbH, Wiesbaden, Germany.

Foam 2: Polyurethane foam sheet with a density of 27 kg/m$^3$, with dimensions of 20 cm×10 cm×2.54 cm, and with a relatively less porous top and bottom surfaces, commercially available under the trade designation "TEXTURED SURFACE FOAM, POLYETHER M-100SF" from Aearo Technologies LLC, Newark, Del., USA.

Texture layer compositions were made using a plastisol ink (i.e., Plastisol 1 or Plastisol 2) as a primary base material and adding glass bubbles or ceramic microspheres as additives to some examples. Mixing was done using a DAC-400 SpeedMixer™ asymmetric centrifugal mixer (Flacktek Inc., Landrum, S.C. USA), mixing until homogeneous (2-3 mins). The texture layer compositions (Examples A1-A6) utilized with the Plastisol Ink Examples are provided in Table 1.

The texture layer compositions (Examples A1-A6) of the Plastisol Ink Examples were screen printed on to sample substrates prepared from each of the Fabric, Non-woven, Foam 1 and Foam 2 materials identified above. For example, the texture layer composition of Example A1 was screen printed to a sample Fabric substrate, a sample Non-woven substrate, a sample Foam 1 substrate, and a sample Foam 2 substrate, generating four Example A1 scrubbing articles (i.e., Example A1 Fabric, Example A1 Non-woven, Example A1 Foam 1, and Example A1 Foam 2). In all cases, the screen printing included use of a metal screen with circular openings approximately 1.8 mm in diameter; each opening was separated from other openings by a distance of approximately 2 mm. The resulting printed articles therefore had a pattern of dots. The printed substrates were placed in an oven at 155° C. for 5 minutes, then removed and allowed to cool for at least 24 hours at room temperature before testing. The features or dots of the so-formed texture layers were found to be raised to a greater or lesser extent depending upon the particular substrate material and amount of texture layer composition applied. With respect to the Non-woven printed substrate samples, for example, the average cured dot height was found to be approximately 0.25 mm.

The printed substrate samples (i.e., Fabric, Non-woven, Foam 1, and Foam 2) with the methacrylate plastisol ink-based texture layer composition of Example A4 were subjected to additional post-formation processing. In particular, after oven curing and cooling for 24 hours, these printed substrates (i.e., Example A4 Fabric, Example A4 Non-woven, Example A4 Foam 1, and Example A4 Foam 2) were subjected to treatment by electron beam to effect e-beam crosslinking of the printed texture composition. The Example A4 printed substrates were subjected to e-beam radiation in a continuous line that was operated at a line speed of 6 m/s and at a voltage of 200 kV. The radiation level was 20 Mrad. The Example A4 printed substrates passed under the e-beam only once. Dot adhesion of the Plastisol Ink Example scrubbing article samples was evaluated following the heat cure steps above. In all cases, dot adhesion was determined to be relatively good. Dot adhesion evaluation including dry scrubbing each Plastisol Ink Example scrubbing article against a hard surface until the corresponding dots began to fail. In all cases, dot failure did not occur at the interface of the texture layer and the substrate.

For the Plastisol Ink Example scrubbing article samples utilizing Fabric or Non-woven as the substrate, the failure was within the dot itself. For the Plastisol Ink Example scrubbing article samples utilizing Foam 1 or Foam 2 as the substrate, the failure was within the substrate). It was found that when scrubbing with gentle to moderate pressure, the dot size or shape of all scrubbing article samples was not affected.

Surface tackiness of the Plastisol Ink Example scrubbing article samples was manually evaluated (measured qualitatively by finger pressure). The surface of the scrubbing article samples associated with Examples A1-A3 (i.e., polyvinyl chloride plastisol ink) did not generally exhibit surface tack.

Laundry durability of the Plastisol Ink Example scrubbing article samples was evaluated by placing the samples in a washing machine along with untreated ballast fabric (1.9 kg

TABLE 1

|  | Ex A1 | | Ex A2 | | Ex A3 | | Ex A4 | | Ex A5 | | Ex A6 | |
| --- | --- | --- | --- | --- | --- | --- | --- | --- | --- | --- | --- | --- |
|  | % | g | % | g | % | g | % | g | % | g | % | g |
| Plastisol 1 | 100.0 | 200.0 | 95.0 | 190.0 | 95.0 | 142.5 | | | | | | |
| Plastisol 2 | | | | | | | 100.0 | 200.0 | 95.0 | 142.5 | 95.0 | 142.5 |
| CM | | | 5.0 | 10.0 | | | | | | | 5.0 | 7.5 |
| GB | | | | | 5.0 | 7.5 | | | 5.0 | 7.5 | | |
| Total | 100 | 200 | 100 | 200 | 100 | 150 | 100 | 200 | 100 | 150 | 100 | 150 | of bleached cotton fabric in the form of generally square, hemmed 8100 cm² sheets). 75 g of a commercial detergent (TIDE® liquid detergent commercially available from Procter & Gamble) was added and the washing machine was filled to high water level with hot water (41° C.+/−2° C.). The samples and ballast load were washed twenty times using a 12 minute normal wash cycle. The samples and ballast were then dried together in a conventional tumble drier at 65+/−5° C. for up to forty-five minutes. The so-laundered scrubbing article samples were then visually reviewed. All Plastisol Ink Example scrubbing article samples exhibited good durability to the wash, with no loss of adhesion of the texture layer to the corresponding substrate. Further, all Plastisol Ink Example scrubbing article samples exhibited no change in dot integrity (i.e., evaluated pre- and post-wash), as tested by dry scrubbing of the scrubbing article sample against a smooth solid surface with moderate hand pressure.

The testing associated with the Plastisol Ink Example scrubbing articles demonstrated the viability of scrubbing (or scouring) articles incorporating a plastisol ink-based texture layer.

Hot Melt Adhesive Examples

Abbreviations for materials and reagents used in the Hot Melt Adhesive Examples are as follows:

Hot Melt 1: Moisture curing polyurethane hot melt with a Shore D hardness of 45, commercially available under the trade designation "Scotch-Weld™ PUR Adhesive TS-230" from 3M Company, St. Paul, Minn., US.

Hot Melt 2: Non-reactive ethylene vinyl acetate hot melt, with a Shore A hardness of about 90, commercially available under the trade designation "Hot Melt 3792" from 3M Company, St. Paul, Minn., US.

Hot Melt 3: Non-reactive polypropylene hot melt, with a Shore A hardness of about 90, commercially available under the trade designation "Hot Melt 3731" from 3M Company, St. Paul, Minn., US.

Hot Melt 4: Moisture curing polyurethane hot melt, with a Shore D hardness of 20, commercially available under the trade designation "Scotch-Weld™ PUR Adhesive TE300LT black" from 3M Company, St. Paul, Minn.

Hot Melt 5: TECHNOMELT PUR CLEANER 2, from Henkel Corporation, Rocky Hill, Conn., US.

Abrasive: Aluminum oxide mineral, Grade 280, from Cometals, Fort Lee, N.J., US.

Foam 3: Cellulose sponge cloth with a unit weight of approximately 475 g/m² and with an average ultimate tensile strain of 35%, approximately 5 mm thick, commercially available from 3M Company, St. Paul, Minn., US.

Foam 4: Cellulose sponge cloth with a unit weight of 480 g/m² and with an average ultimate tensile strain of 23%, approximately 3 mm thick, commercially available from Full Circle Home LLC, New York, N.Y., US, and obtained from retail seller Bed Bath & Beyond.

Foam 5: Cellulose sponge cloth (blue) with a unit weight of 100 g/m² and with an average ultimate tensile strain of 60%, approximately 1 mm thick, commercially available from Kalle GmbH, Wiesbaden, Germany (identical to "Foam 1" of the Plastisol Ink Examples).

Foam 6: Cellulose sponge cloth (yellow) with a unit weight of 120 g/m² and with an average ultimate tensile strain of 60%, approximately 1 mm thick, commercially available from Kalle GmbH, Wiesbaden, Germany.

Hot Melt Adhesive Example scrubbing article samples were prepared by applying each of the hot melt adhesives identified above (i.e., Hot Melt 1, Hot Melt 2, Hot Melt 3, Hot Melt 4, and Hot Melt 5) as a texture layer composition to individual substrate samples prepared from each of the substrates identified above (i.e., Foam 3, Foam 4, Foam 5, and Foam 6) as described below. In all cases, the hot melt adhesive was applied in various patterns such as dots and lines. The so-generated texture layer features generally ranged from 1 to 3 mm in height and width (or diameter).

Hot Melt 1 and Hot Melt 2 were applied to the corresponding substrate samples (individual samples of Foam 3-Foam 6) using a Scotch-Weld™ PUR Easy 250 Applicator (from 3M Company, St. Paul, Minn.) operated at a temperature of 250° F. (121° C.). In one experiment, the applicator was connected to a die with seven holes, each about 0.8 mm in diameter, equally spaced along a line about 4 cm long. To deliver the hot melt adhesive texture layer composition through the die at an appropriate rate, Hot Melt 1 required $4.4 \times 10^5$ Pa (65 psig) air pressure; Hot Melt 4 required $2.1 \times 10^5$ Pa (30 psig) air pressure. For this experiment, the corresponding foam substrate sample was passed under the die using a conveyor belt at an approximate rate of 3 m/minute, and the die was purged using Hot Melt 5.

Hot Melt 2 was applied to the corresponding substrate samples (individual samples of Foam 3-Foam 6) using a 3M Hot Melt Applicator EC (from 3M Company, St. Paul, Minn.) operated at a temperature at 400° F. (205° C.).

Hot Melt 3 was applied to the corresponding substrate samples (individual samples of Foam 3-Foam 6) using a 3M Hot Melt Applicator TC (from 3M Company, St. Paul, Minn.) operated at a temperature at 385° F. (196° C.).

Using the above application conditions, Hot Melt Example scrubbing articles were prepared using both dry and wetted formats of substrate samples (Foam 3-Foam 6). With the dry format, the corresponding substrate sample was supplied in a flat or compressed state. With the wetted format, the substrate was wetted with city tap water and then either rung out by hand or squeezed dry in padding equipment (commercially available from Poterala Manufacturing Co., Greenville, S.C., US) with nip pressures set to $2.1 \times 10^5$ Pa (30 psi). For some experiments, the substrate sample of Foam 3 (5 mm thick) was cut in the thickness dimension to yield two foam substrate samples of approximately 2.5 mm thickness each with a textured or roughed side and a cut smooth side.

For some experiments, after applying the selected hot melt adhesive, Abrasive was applied to the adhesive surface by hand sprinkling while the hot melt adhesive was still in a molten state as a further component of the corresponding texture layer composition. Adhesion of the Hot Melt Adhesive Example scrubbing article samples was evaluated following the application of the corresponding hot melt adhesive (and optional Abrasive) after cooling for at least 72 hours. Some of the Hot Melt Adhesive Example scrubbing article samples were allowed to dry, while others were kept moist as identified in Table 2 below. Adhesion was tested using a commercial washing machine, following the procedures described in AATCC™ 130-2010, except that the samples were not tumble-dried (machine-dried) at the end of the wash cycle but instead evaluated in the moist state. Five replicates from each of the prepared scrubbing article samples were cut into 10 cm×10 cm squares and then washed. After washing, the adhesion of the texture layer (i.e., hot melt adhesive) was rated for all five replicate samples, and the average rating was recorded as provided in Table 2. A 1 to 5 rating scale was used, where "5" indicates no perceptible loss of the texture layer and "1" indicates complete loss of the texture layer. As reflected by Table 2, all of the Hot Melt Adhesive Example scrubbing article samples exhibited excellent retention of the hot melt adhesive-based texture layer to the corresponding substrate.

TABLE 2

| Substrate | Wetting State of Substrate | Substrate Surface Receiving Hot Melt Adhesive | Hot Melt Type | Pattern | Abrasive? | Storage State | Adhesion Rating 1-5 (5 = best) |
|---|---|---|---|---|---|---|---|
| Foam 6 | dry | textured | Hot Melt 1 | straight lines | none | dry | 5 |
| Foam 6 | dry | textured | Hot Melt 1 | wavy lines | none | dry | 5 |
| Foam 6 | dry | textured | Hot Melt 1 | wavy lines | yes | dry | 5 |
| Foam 6 | wet | textured | Hot Melt 1 | straight lines | none | wet | 5 |
| Foam 6 | wet | textured | Hot Melt 1 | wavy lines | none | wet | 5 |
| Foam 6 | wet | textured | Hot Melt 1 | wavy lines | yes | wet | 5 |
| Foam 3 | wet | smooth | Hot Melt 1 | straight lines | none | wet | 5 |
| Foam 3 | wet | textured | Hot Melt 1 | straight lines | none | wet | 5 |
| Foam 6 | dry | smooth | Hot Melt 4 | straight lines | none | dry | 5 |
| Foam 6 | dry | smooth | Hot Melt 4 | wavy lines | none | dry | 5 |
| Foam 6 | dry | smooth | Hot Melt 4 | straight lines | yes | dry | 5 |
| Foam 6 | wet | smooth | Hot Melt 4 | straight lines | none | dry | 5 |
| Foam 3 | wet | smooth | Hot Melt 4 | straight lines | none | wet | 5 |
| Foam 3 | wet | textured | Hot Melt 4 | straight lines | none | wet | 5 |

The testing associated with the Hot Melt Adhesive Example scrubbing articles demonstrated the viability of scrubbing (or scouring) articles incorporating a hot melt adhesive-based texture layer.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention can be determined with reference to the appended claims, along with the full scope of equivalents to which such claims are entitled.

Although the present disclosure has been described with reference to preferred embodiments, those skilled in the art will recognize that changes can be made in form and detail without departing from the spirit and scope of the present disclosure.

What is claimed is:

1. A scrubbing article comprising:
   a substrate; and
   a solvent-free texture layer formed on a surface of the substrate,
   wherein the texture layer includes a polyamide, polyester, polyacrylate, polycarbonate, or epoxy hot-melt adhesive, and
   wherein the texture layer comprises ceramic microparticles or $Al_2O_3$, $CaCO_3$, $SiO_2$, or talc abrasive minerals.

2. The scrubbing article of claim 1, wherein the texture layer is formed by a solidified texture layer composition applied to the surface, and further wherein the texture layer composition includes a solvent-free primary base material.

3. The scrubbing article of claim 1, wherein the texture layer defines a height relative to the surface of at least 1000 microns.

4. The scrubbing article of claim 1, wherein the substrate is a cellulose sponge.

5. The scrubbing article of claim 1, wherein the texture layer defines a pattern.

6. The scrubbing article of claim 1, further comprising: an auxiliary substrate affixed to the second major face.

7. The scrubbing article of claim 1, wherein the substrate is a cellulose sponge having an average ultimate tensile strain of at least 20%.

8. A method of producing a scrubbing article comprising:
providing a substrate;
applying a texture layer composition in flowable form onto a surface of the substrate, wherein a primary base material of the texture layer composition is solvent-free, wherein the texture layer composition comprises a polyamide, polyester, polyacrylate, polycarbonate, or epoxy hot melt adhesive, and wherein the texture layer comprises ceramic microparticles or $Al_2O_3$, $CaCO_3$, $SiO_2$, or talc abrasive minerals; and
solidifying the applied texture layer composition to form a texture layer secured to the substrate.

9. The method of claim 8, wherein the step of solidifying the applied texture layer composition is characterized by the absence of solvent removal from the texture layer composition.

10. The method of claim 8, wherein the substrate is a cellulose sponge and wherein during the step of applying the texture layer composition, the cellulose sponge is wet.

\* \* \* \* \*